United States Patent [19]

Solhjell et al.

[11] Patent Number: 4,763,216
[45] Date of Patent: Aug. 9, 1988

[54] CLEANING CASSETTE FOR A MAGNETIC TAPE RECORDER MEANS

[75] Inventors: Erik Solhjell, Oslo; Guttorm Rudi, Fjellhamar, both of Norway

[73] Assignee: Tandberg Data A/S, Oslo, Norway

[21] Appl. No.: 85,371

[22] Filed: Aug. 14, 1987

[30] Foreign Application Priority Data

Sep. 30, 1986 [DE] Fed. Rep. of Germany ....... 3633221

[51] Int. Cl.⁴ .............................................. G11B 5/41
[52] U.S. Cl. ..................................................... 360/128
[58] Field of Search ................................. 360/128, 137

[56] References Cited

U.S. PATENT DOCUMENTS

| | | | |
|---|---|---|---|
| 3,439,922 | 4/1969 | Howard | 274/47 |
| 3,761,994 | 10/1973 | Becht | 15/210 |
| 4,141,053 | 2/1979 | Kara | 360/128 |
| 4,272,796 | 6/1981 | Van Kreuningen | 360/128 |
| 4,445,158 | 4/1984 | Clausen et al. | 360/137 |
| 4,470,089 | 9/1984 | Hutchins et al. | 360/137 |
| 4,514,777 | 4/1985 | Kudo | 360/128 |
| 4,586,099 | 4/1986 | Suzuki et al. | 360/128 |
| 4,669,017 | 5/1987 | Blank et al. | 360/128 |

FOREIGN PATENT DOCUMENTS 2000623 1/1979 United Kingdom .

OTHER PUBLICATIONS

Japan-Pat. No. 59-60727(A), Fujitsu K. K., vol. 8, No. 165 (p-291) (1602), Jul. 31, 1984.

Primary Examiner—Robert S. Tupper
Attorney, Agent, or Firm—Hill, Van Santen, Steadman & Simpson

[57] ABSTRACT

A cleaning cassette has, at one longitudinal side, a cleaning element for cleaning a magnetic head of a magnetic tape recorder, and has a cleaning element at the opposite longitudinal side for cleaning a tape drive roller of the magnetic tape recorder. Dependent on the direction in which the cleaning cassette is introduced into the magnetic tape recorder, the one cleaning element comes into contact with the magnetic head, or the further cleaning element comes into contact with the tape drive roller, for the purpose of cleaning. The magnetic head is cleaned by a reciprocating motion of the cleaning element via an eccentric arrangement effected by the tape drive roller. The cleaning of the tape drive roller upon introduction of the cleaning cassette in an opposite direction occurs due to the rotational motion of the tape drive roller given a stationary, further cleaning element.

15 Claims, 2 Drawing Sheets

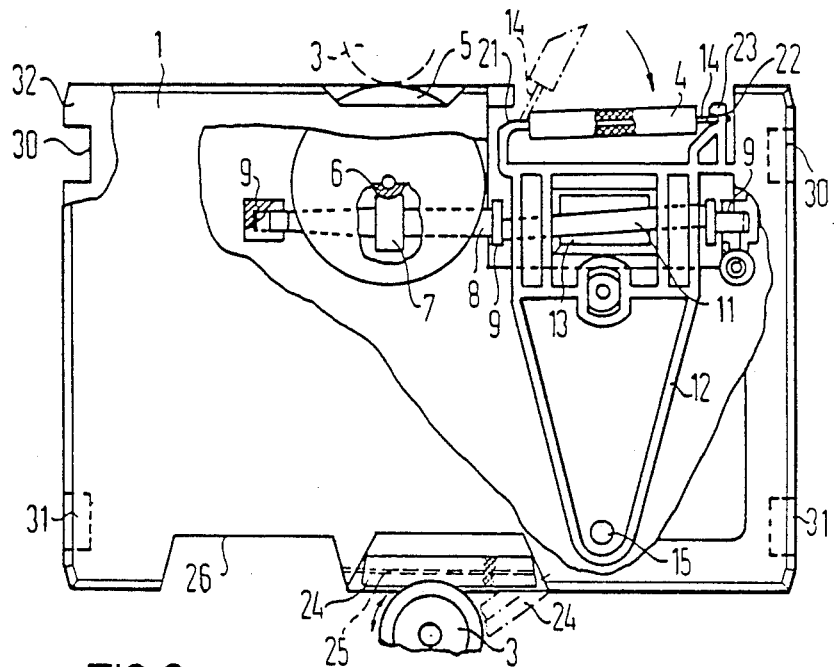
FIG 1
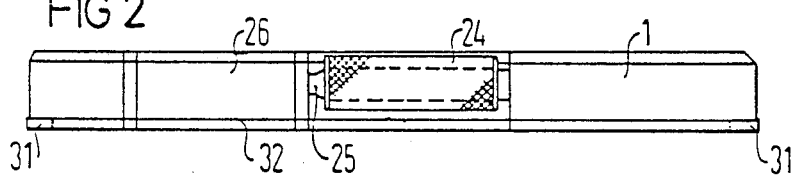
FIG 2

CLEANING CASSETTE FOR A MAGNETIC TAPE RECORDER MEANS

BACKGROUND OF THE INVENTION

1. Field of the Invention

The invention is directed to a cleaning cassette for a magnetic tape recorder wherein the cleaning cassette is introduced into the magnetic tape recorder instead of a magnetic tape cassette. The cleaning cassette contains a cleaning device for cleaning the magnetic head of the recorder.

2. Description of the Prior Art

It is already notoriously known to employ a cassette for cleaning a magnetic head and a tape drive roller for the magnetic tape in a magnetic tape recorder, this cassette being inserted into the magnetic tape recorder means instead of a cassette provided with the magnetic tape. Instead of the magnetic tape, these cleaning cassettes contain cleaning devices for the magnetic head and may also contain cleaning devices for the tape drive roller driving the magnetic tape. Such cleaning cassettes are disclosed, for example, by U.S. Pat. No. 4,445,158, or by U.S. Pat. No. 4,272,796, both incorporated herein by reference. In these known cleaning cassettes, the cleaning mechanism for the magnetic head is respectively driven by a drive arrangement which normally drives the reels having the magnetic tape in the magnetic tape cassette. It is thus possible to simultaneously clean the magnetic head and the tape drive roller since the cleaning elements for the magnetic head and for the tape drive roller are situated side-by-side at the same side of the magnetic tape cassette.

Magnetic tape recorder means are known wherein a magnetic tape cassette is employed with the tape being moved via a tape drive means and the reel being also driven via a rubber band embracing the reels. A cleaning cassette for such a magnetic tape recorder means has likewise already been proposed (European Patent Application No. 86104435.2) wherein a cleaning mechanism for the magnetic head is driven by the tape drive roller. Since the tape drive roller is employed for the drive of the cleaning device, its simultaneous cleaning with this cleaning cassette is not possible without further steps being taken.

SUMMARY OF THE INVENTION

It is therefore an object of the invention to specify a cleaning cassette wherein the cleaning device for the magnetic head is actuated via a tape drive roller and by means of which a cleaning of the tape drive roller is nonetheless possible.

Given a cleaning cassette of the type initially cited, this objective is achieved in accordance with the invention by providing a cleaning cassette which contains a first cleaning means at one end of the cleaning cassette for cleaning a magnetic head of the magnetic tape recorder and which at an opposite end of the cleaning cassette has a second cleaning means for cleaning the tape drive roller. Accordingly, either the tape drive roller or the magnetic head is cleaned, depending on a direction of insertion of the cleaning cassette into the magnetic tape recorder.

The cleaning cassette of the invention has the advantage that it exhibits extremely good cleaning properties since, dependent on the direction in which it is introduced into the magnetic tape recorder means, either the magnetic head or the tape drive roller is cleaned.

Preferably, an identical or the same cleaning element formed of a flexible material such as, for example, cellular material or felt is utilized both for cleaning the magnetic head as well as for cleaning of the tape drive roller. In order to eliminate the deposits, it is beneficial to provide the cleaning element with grooves. These grooves can be provided at one side or at both sides of the cleaning element, so that an optimum cleaning of the magnetic head, or of the tape drive roller, is achieved dependent on application. The cleaning element for the tape drive roller can be arranged parallel or perpendicular to the longitudinal wall of the cleaning cassette which lies opposite that side at which the cleaning device for the magnetic head is arranged.

The cleaning elements are preferably interchangeably designed. For this purpose, the cleaning elements can be provided with an opening by means of which they can be plugged over a latchable, flexible strip. It is also possible to insert the cleaning element for the tape drive roller in a longitudinal direction into an opening of the cleaning cassette.

Exemplary embodiments of the cleaning cassette of the invention shall be set forth in greater detail below with reference to the drawings.

BRIEF DESCRIPTION OF THE DRAWINGS

FIG. 1 is a partially broken plan view of a first embodiment of a cleaning cassette;

FIG. 2 is a side view of the cleaning cassette shown in FIG. 1;

FIGS. 3a-3h shows various embodiments of cleaning elements;

DESCRIPTION OF THE PREFERRED EMBODIMENTS

Figure 4:
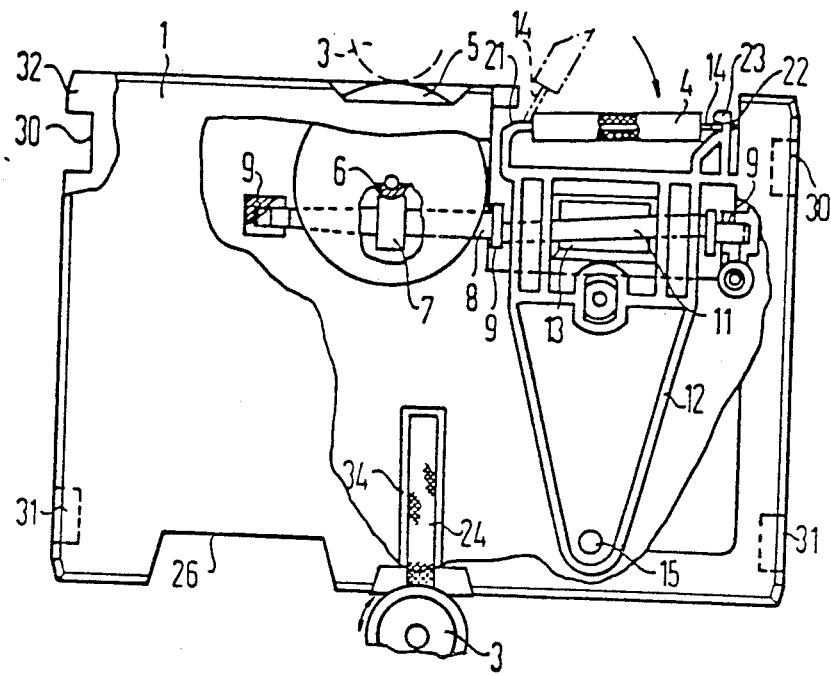
FIG. 4. shows a partially broken plan view of a second embodiment of the cleaning cassette.

The cleaning cassette 1 of a first embodiment of the invention shown in FIG. 1 has external dimensions which largely correspond to those of a commercially available cassette provided with magnetic tape also known under the designation ¼-inch cartridge. The portion of the cleaning cassette 1 shown in FIG. 1 which relates to the cleaning of the magnetic head is disclosed in detail in European Patent Application No. 86104435.2. The cassette 1 is introduced into a corresponding magnetic tape recorder means comprising a magnetic head and a tape drive roller 3 normally provided for the drive of the magnetic tape. With such an introduction, the front or first insertion end side of a magnetic head (not shown) presses against a cleaning element 4 of a cleaning means contained in the cassette 1, and a tape drive roller 3 shown in broken lines presses against a drive wheel 5 of the cassette 1. The drive wheel 5, for example, is designed as a friction wheel and has a coating of rubber on its circumference. A worm 6 is arranged on the shaft of the drive wheel 5, this worm 6, for example, forming a structural unit together with the drive wheel 5. The worm 6 is part of a worm gearing and is arranged on a worm wheel 7 that is arranged on a shaft 8. The shaft 8 is seated in bearings 9. An eccentric shaft 11 is also provided. The worm wheel 7 is arranged on shaft 8.

The eccentric shaft 11 is arranged inclined relative to the axis of the shaft 8 and, given a rotation of the shaft 8, and eccentric movement of shaft 11, a carrier 12 is placed in reciprocating motion and is simultaneously placed into a vibrational motion which can also be interpreted as a swivel motion or partial rotational motion. A carrier 12 has its back end seated by means of a spherical part 15 and embraces the eccentric shaft 11 at the one side, for example at the upper side, by lateral seating surfaces and embraces it at the other side, for example at the lower side, by a lip 13. A swivelable strip 14 may be seen at the front side of the carrier, this strip 14 being secured to the carrier 12 via an articulation 21. When the carrier is formed of plastic, the articulation is fashioned, for example, as a film hinge. At its other end, the strip 14 comprises a catch nose 22 which can be inserted into a corresponding opening 23 of the carrier 12. The cleaning element 4 is inserted over the strip 14, this cleaning element 4 comprising a corresponding longitudinal opening. The cleaning element 4 is interchangeably secured to the strip 14 and, when the latter is pivoted out, can be simply replaced or turned, so that it can be used proceeding from both sides. The cleaning element 4 is constructed in pillow-like or cuboid-like fashion. It is formed of a flexible material, for example, of cellular material, and can be saturated with a cleaning fluid.

For cleaning the tape drive roller 3, the cassette 1 is introduced into the magnetic tape recorder means in the opposite direction, so that a second insertion end opposite the first insertion end enters the recorder. Thus, the tape drive roller 3 now shown with solid lines presses against a corresponding cleaning element 24 which can be constructed in the same way as the cleaning element 4. This cleaning element 24 is also arranged on a strip 25 which is constructed in a way similar to the way the strip 14 is constructed, and which likewise comprises a catch nose which can also be swiveled out of the cassette 1 for replacing the cleaning element 24, as shown in broken lines. The cleaning element 24 and a corresponding opening for the magnetic head are arranged at that side of the cassette 1 lying opposite the cleaning element 4. Thus, either the magnetic head or the tape drive roller 3 can be cleaned, dependent on the direction in which the cassette 1 is introduced. Normally, the cassette 1 only contains incisions 30 in the base plate, these intending to prevent an introduction of the cassette in the wrong direction. Since, however, the cassette can now be introduced into the magnetic tape recorder means in both directions dependent upon whether the magnetic head or the tape drive roller 3 are to be cleaned, two additional cut-outs 31 are provided in the base plate 32. When the cassette 1 is introduced into the magnetic tape recorder means and the tape drive roller 3 contacts the cleaning element 4, the tape drive roller 3 can be driven in both rotational directions and the tape drive roller 3 is cleaned due to the contact with the cleaning element 24.

In the side view shown in FIG. 2, it may be seen that the cleaning element 24 is designed in the same way as the cleaning element 4 and is likewise plugged onto a strip 25 having a catch nose. Furthermore, the additional cut-outs 31 in the base plate 32 of the cassette 1 may be seen.

The cleaning elements 4 and 24 can have different surfaces. FIGS. 3a through 3d show some exemplary embodiments.

Given the embodiment shown in FIG. 3a, the cleaning element 4 or 24 has longitudinal grooves at one side. This side is particularly suitable for cleaning the magnetic head, whereas the back side for the cleaning of the tape drive roller 3 can be employed without the grooves. For this purpose, the cleaning element can be plugged onto the strip 14 or 25 in the one or in the other direction.

In the illustration in FIG. 3b, the cleaning element 4 or 24 is symmetrically constructed, so that it can be arbitrarily plugged onto the strip 14 or 25.

The cleaning element 4 or 24 shown in FIG. 3c comprises obliquely proceeding grooves and this cleaning element can likewise be employed both for cleaning the magnetic head as well as for cleaning the magnetic tape drive roller 3. Grooves can also be provided at the back side and the cleaning element can then be arbitrarily plugged onto the strip 14 or 25 by means of the longitudinal opening 33.

A similar case applies to the cleaning element 4 or 24 shown in FIG. 3d wherein the grooves are arranged in lozenge-shaped fashion on both sides.

The second embodiment of the cleaning cassette 1 shown in FIG. 4 contains the same component parts for cleaning the magnetic head as does the cleaning cassette 1 shown in FIG. 1. For cleaning the tape drive roller 3, however, the cleaning element 24 is arranged perpendicular to the longitudinal wall, so that it is not the long side but the cross-side of the cleaning element 24 which cleans the tape drive roller 3. The cleaning element 24 is inserted longitudinally into a corresponding opening and presses resiliently against the tape drive roller 3. Here, too, the cleaning element 24 can be identical to the cleaning element 4 which undertakes the cleaning of the magnetic head. However, it is also possible to employ different cleaning elements for cleaning the tape drive roller 3.

Figure 5:
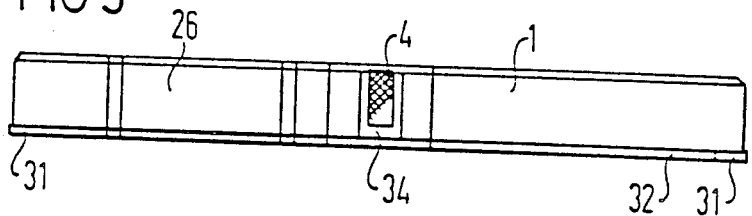
FIG. 5 is a side view of the cleaning cassette shown in FIG. 4.

Given the side view of the cassette 1 shown in FIG. 5, one can see that the cleaning element 24 has been inserted lengthwise into the opening 34. In this cassette 1, cut-outs 31 are provided in the base plate 32 in order to be able to optionally introduce the cassette 1 into the magnetic tape recorder means in the one or in the opposite direction.

Although various minor changes and modifications might be proposed by those skilled in the art, it will be understood that we wish to include within the claims of the patent warranted hereon all such changes and modifications as reasonably come within our contribution to the art.

We claim as our invention:

1. A cleaning cassette for a magnetic tape recorder which is introduced into the magnetic tape recorder instead of a magnetic tape cassette, comprising:
   the cleaning cassette having first and second insertion ends opposite one another;
   at said first insertion end a first cleaning means being provided for cleaning the magnetic head of the magnetic tape recorder; and
   at said opposite second insertion end a second cleaning means being provided for cleaning a tape drive roller of the magnetic tape recorder, whereby depending upon a direction of insertion of the cleaning cassette, either the magnetic head or the tape drive roller is cleaned.

2. A cleaning cassette according to claim 1 wherein said second cleaning means comprises a strip-shaped cleaning element arranged parallel to an end wall at said second insertion end.

3. A cleaning cassette according to claim 1 wherein said second cleaning means comprises a strip-shaped cleaning element arranged perpendicular to an end wall at said second insertion end.

4. A cleaning cassette according to claim 1 wherein the first and second cleaning means each comprise a strip-shaped interchangeable cleaning element usable with either the first or second cleaning means.

5. A cleaning cassette according to claim 1 wherein said second cleaning means comprises a strip-shaped cleaning element having means for permitting plugging onto a mounting strip.

6. A cleaning cassette according to claim 1 wherein said second cleaning means comprises a strip-shaped cleaning element and wherein a longitudinal aperture extending perpendicular to an end wall at the second insertion end is provided for receiving the cleaning element.

7. A cleaning cassette according to claim 1 wherein the first and second cleaning means each have a strip-shaped cleaning element of the same dimensions so that they are interchangeable.

8. A cleaning cassette according to claim 1 wherein the first and second cleaning means each comprise a cube-shaped cleaning element of a flexible material.

9. A cleaning cassette according to claim 1 wherein the first and second cleaning means each comprise a cleaning element with grooves.

10. A cleaning cassette according to claim 9 wherein the grooves are provided at only one side of the cleaning element.

11. A cleaning cassette according to claim 1 wherein the first and second cleaning means comprise a cleaning element of a cellular material.

12. A cleaning cassette for a magnetic tape recorder which is introduced into the magnetic tape recorder instead of a magnetic tape cassette, comprising:
the cleaning cassette having first and second insertion ends;
at said first insertion end a first cleaning means including a first strip-shaped cleaning element being provided at an end wall for cleaning the magnetic head of the magnetic tape recorder; and
at said opposite second insertion end a second cleaning means including a second strip-shaped cleaning element interchangeable with the first element being provided at an end wall for cleaning a tape drive roller of the magnetic tape recorder, whereby depending upon a direction of insertion of the cleaning cassette, either the magnetic head or the tape drive roller is cleaned.

13. A cleaning cassette according to claim 12 wherein the first and second cleaning elements each mount on a pivotable mounting arm, and wherein means are provided for mounting the mounting arm in an operating position or in a released position for removal of the first or second cleaning element.

14. A cleaning cassette according to claim 12 wherein a mounting means is provided for the first cleaning element which causes a reciprocating movement of the cleaning element across the magnetic head and wherein a second mounting means is provided for the second cleaning element which holds the second cleaning element substantially stationary as it cleans the tape drive roller.

15. A cleaning cassette according to claim 12 wherein cut-out means are provided on the cleaning cassette adjacent both the first and second insertion ends for permitting the cleaning cassette to be retained within the tape recorder given the insertion at the first insertion or the second insertion end.

* * * * *